United States Patent Office 2,953,520
Patented Sept. 20, 1960

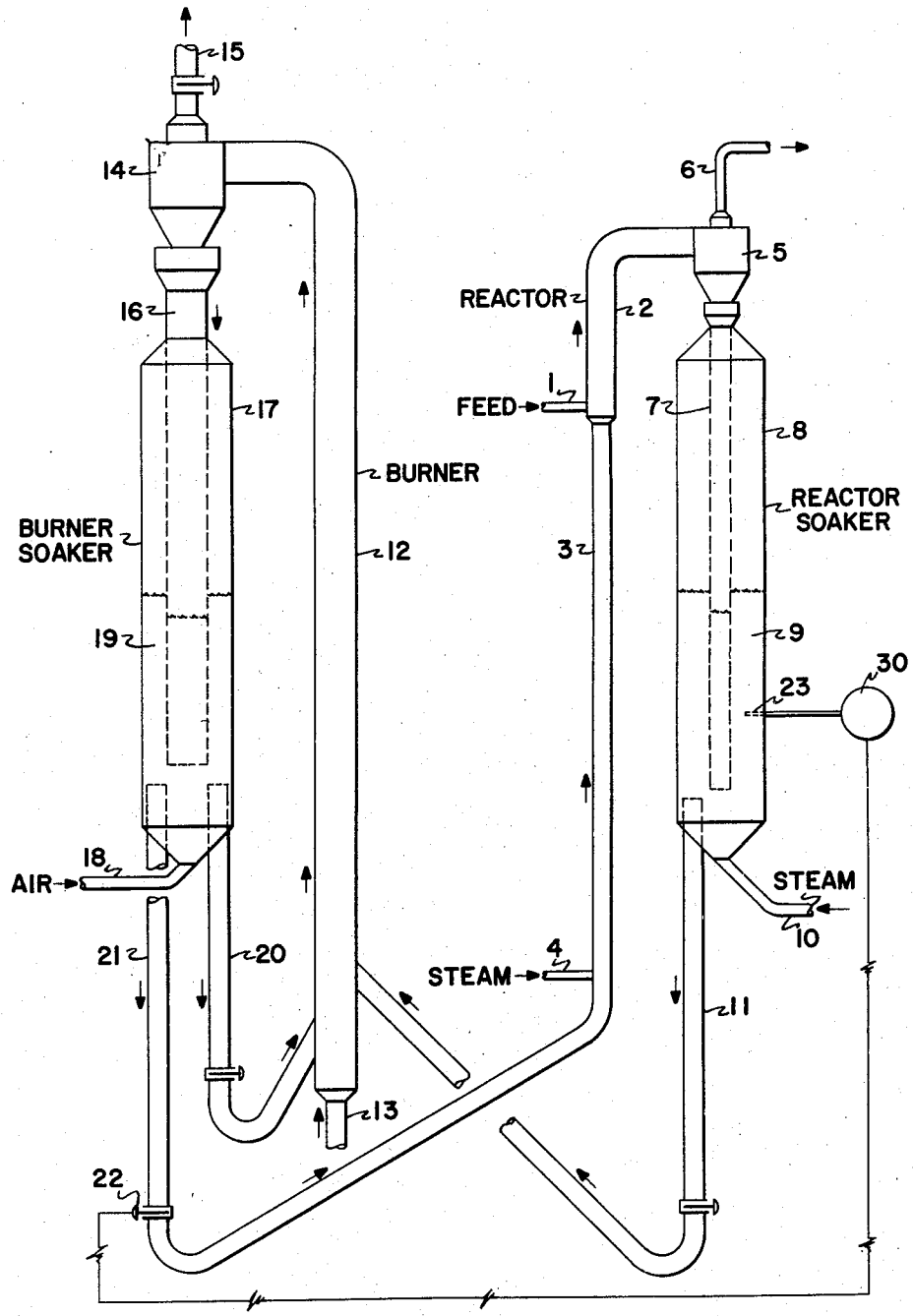

2,953,520

TEMPERATURE CONTROL FOR TRANSFER LINE REACTORS

Worth William Boisture, Baton Rouge, La., assignor to Esso Research and Engineering Company, a corporation of Delaware Filed Apr. 26, 1957, Ser. No. 655,410

10 Claims. (Cl. 208—159)

This invention relates to improvements in temperature control in the transfer line conversion of heavy hydrocarbon oils to lower molecular weight unsaturated hydrocarbons. More particularly it relates to a process of this nature wherein the temperature control is obtained by sensing the temperature of the solids in a vessel outside the transfer line reactor.

In the prior art various proposals have been made for carrying out reactions by contacting gases, vapors and liquids with particulate solids flowing in the form of a fluidized, dispersed suspension in a transfer line. A particular application of this general technique relates to the coking or thermal conversion of heavy hydrocarbon oils to lower boiling materials including gas oils, naphthas, low molecular weight normally gaseous hydrocarbon unsaturates and coke, generally conducted at a temperature in the range of 1100° to 1800° F.

In the coking reactions particularly, the desired conversion ordinarily is accomplished by contacting the material to be converted with fluidized, i.e., a rapidly flowing stream or dispersed suspension of preheated, finely divided, usually non-catalytic, solid particles such as coke, sand, etc. (As to nomenclature see Industrial and Engineering Chemistry, vol. 41, page 1249.) These particles may vary in size but ordinarily they range between about 20 and 800 micron particle diameter with a consequent wide difference in actual particle size in any given sample.

Heavy hydrocarbon oil feeds suitable for the process are reduced crudes, vacuum bottoms, pitch, asphalt, other heavy hydrocarbon residua or mixtures thereof. Typically such feeds can have an initial boiling point of about 700° F., an A.P.I. gravity of about 0° to 20°, e.g. 1.9°, and a Conradson carbon content of about 5 to 40 wt. percent. (As to Conradson carbon residue see A.S.T.M. Test D-189-41.)

The heat for carrying out the endothermic coking reaction is generated in the burner vessel, usually separate. A stream of coke is transferred from the reactor to the burner vessel, such as a transfer line or fluid bed burner, employing a standpipe or riser system; steam and/or air usually being supplied to the riser for conveying the solids to the burner. Sufficient coke or added carbonaceous matter is burned in the burner vessel to bring the solids therein up to a temperature sufficient to maintain the system in heat balance. The burner solids are maintained at a higher temperature than the solids in the reactor.

One of the problems in the high temperature coking for chemicals is control of the temperature in the transfer line reactor. This is important because of the short contact time of the feed with the heat carrying solids and the fact that product degradation can easily occur with inadequate temperature control. Various attempts have therefore been made to control this temperature adequately. An indirect means of temperature control involves sensing the pressure buildup across a fixed length of the transfer line riser. The slide valve controlling the solids flow into the riser is then automatically positioned to maintain the pressure buildup constant. With this system the temperature in the transfer line reactor varies over a range of 10° to 30°, which is excessive.

Another control system uses the determination of the temperature in the transfer line and throttling of the slide valve controlling solids flow to the reactor to maintain a temperature as constant as possible. Because of the surging solids flow which is characteristic of disperse phase risers, the thermocouple senses a temperature which varies as much as 10 to 30 degrees over a period of 5 to 10 seconds and a control would attempt to throttle the slide valve to maintain a constant temperature. This would result in a rapidly cycling slide valve operation which would actually aggravate the temperature swings rather than eliminating them since rapid repositioning of the slide valve would cause increased solids surging in the riser.

This invention provides an improved method of overcoming these difficulties. The method comprises discharging the solids from the transfer line reactor, after they are separated from the gaseous products, directly into a soaking zone wherein they are maintained in the form of a dense, turbulent, fluidized bed. The temperature in the dense, turbulent, fluidized bed is determined and the solids flow from the heater to the reactor is controlled by a slide valve responsive to that temperature determination.

The term "soaking zone" connotes any system directly following the transfer line reactor wherein the solids are maintained as indicated. Typically, stripping would also take place in the vessel in order to recover as much of the desired products as possible. In this vessel all of the high frequency, low order fluctuations in temperature resulting from surging solids flow are averaged out by the relatively long solids holding time. Thus the temperature controller senses a relatively stable temperature and the slide valve would not be repositioned rapidly as in the case of the two systems previously described. Such a control system senses a temperature perhaps 20° to 100° F. lower than the reaction zone temperature but can easily be set to give the desired reactor temperature. The slide valve control can, of course, be manual or automatic.

This invention will be better understood by reference to the flow diagram shown in the drawing.

Referring now to the flow diagram, a heavy residual petroleum oil, e.g. a South Louisiana reduced crude at a temperature of 650° F. is introduced through line 1 into transfer line reactor 2. Hot coke solids at a temperature of 1600° F. are fed into transfer line reactor 2 through riser 3, and provide a reaction zone temperature of 1400° F. Fluidizing gas, e.g., steam, is fed in through line 4. The total contact time in the transfer line is about 0.2 to 0.4 second so as to obtain the desired reaction to ethylene, propylene, butadiene and other unsaturates. The effluent of coke particles, unsaturated light gases and vaporized liquid products then enter cyclone separator 5. The gaseous products are withdrawn through line 6 and the solids discharged through line 7 into soaking zone 8. The solids are maintained in the form of a dense, turbulent, fluidized bed 9 by means of aerating steam injected through line 10.

The solids after being maintained in the soaker for about 1 to 10 minutes, e.g., 4 minutes, are discharged through standpipe 11 to transfer line burner 12, although other burner systems, e.g., a conventional dense bed, could be used. Heated air is injected through line 13 to raise the burner solids to the desired temperature, e.g., 1600° F., by combustion. The effluent of solids and flue gases enter cyclone 14 from which the gases are discharged through line 15. The solids are sent through line 16 into burner soaker 17 wherein by the injection of air through line 18 they are maintained in the form of a dense, turbulent, fluidized bed 19. The burner soaker provides surge capacity and can be used to supply additional heat as needed. Some solids are recycled to the transfer line burner 12 through line 20, whereas another portion of the solids is sent through line 21 to riser 3 subject to positive control of slide valve 22.

In accordance with this invention the temperature of the solids in the soaking zone 8 is determined by probe 23. This temperature is e.g. 1350° F. It has been determined for example that in this particular system this is the requisite temperature of correct reaction conditions. This sensed temperature is fed into automatic temperature controller 30 and the slide valve 22 controlled automatically to maintain this temperature.

The improved method of this invention is applicable to other systems such as the high temperature conversion of gas oils, naphthas, or gaseous feeds by catalytic or non-catalytic methods where temperature control in the transfer line reactor itself presents the difficulties discussed.

The conditions of transfer line coking of heavy hydrocarbon oils for chemicals are elaborated upon the tables presented below.

*Conditions in transfer line reactor*

|  | Broad Range | Preferred Range |
| --- | --- | --- |
| Temperature, °F | 1,100–1,800 | 1,400–1,600 |
| Superficial Velocity of Gas, ft./sec. | 5–150 | 30–75 |
| Contact time, sec. | 0.01–2.0 | 0.2–1.0 |

*Conditions in heater*

|  | Broad Range | Preferred Range |
| --- | --- | --- |
| Temperature, °F | 1,200–2,300 | 1,600–1,800 |
| Superficial Velocity of Fluidizing Gas, ft./sec. | 0.2–150 | 30–75 |

The advantages of this invention will be apparent to the skilled in the art. An efficient, simple means of providing temperature control is provided in a system wherein that control is extremely important.

It is to be understood that this invention is not limited to the specific examples which have been offered merely as illustrations and that modifications may be made without departing from the spirit of the invention.

What is claimed is:

1. In a process of converting a heavy hydrocarbon oil to coke and lower boiling materials including low molecular weight normally gaseous unsaturated hydrocarbons by contacting the heavy hydrocarbon oil with a dispersed suspension of hot particulate solids in a one-stage transfer line reaction zone for a relatively short time at a high temperature, recovering the solids and circulating the solids to an external heating zone to increase their temperature and returning heated solids to the transfer line reaction zone subject to positive control of a slide valve, the improvement which comprises separating solids from gaseous products leaving said transfer line reaction zone and discharging the so separated solids directly into a soaking zone wherein they are maintained in the form of a dense turbulent fluidized bed before being returned to said external heating zone, determining the temperature of the solids in said dense turbulent fluidized bed to obtain an indication of the temperature in said transfer line reaction zone and controlling the hot solids flow to said transfer line reaction zone by the slide valve in response to the temperature determination to maintain the desired temperature in said transfer line reaction zone.

2. The process of claim 1 in which the solids are non-catalytic solids.

3. The process of claim 1 in which the solids are coke.

4. The process of claim 1 in which the conversion is conducted at a temperature in the range of 1100° to 1800° F.

5. A process according to claim 1 wherein the temperature in said transfer line reaction zone is about 1400° F. and the temperature in said dense fluidized bed in said soaking zone is about 1350° F.

6. A process according to claim 1 wherein the temperature in said transfer line reaction zone is between about 1400° F. and 1600° F. and the temperature in said dense fluidized bed in said soaking zone is at a lower figure than that in said transfer line reaction zone.

7. In a process of converting a heavy hydrocarbon oil to coke and lower boiling materials including low molecular weight normally gaseous unsaturated hydrocarbons, wherein the heavy hydrocarbon oil is admixed with a disperse suspension of hot particulate solids and the admixture is passed through a one-stage transfer line reaction zone at a relatively high velocity to provide a relatively short time high temperature reaction, recovering the solids from reaction products and circulating the solids to an external heating zone to increase their temperature above that existing in said transfer line reaction zone and controlling the return of heated solids to the transfer line reaction zone in response to the temperature of the solids separated from the reaction products, the improvement which comprises separating solids from gaseous products leaving said transfer line reaction zone and discharging the so separated solids directly into a soaking zone wherein they are maintained in the form of a dense turbulent fluidized bed before being returned to said external heating zone, determining the temperature of the solids in said dense turbulent fluidized bed to obtain an indication of the temperature in said transfer line reaction zone and positively controlling the flow of heated solids from said external heating zone to said transfer line reaction zone in response to the temperature determination to maintain the desired temperature in said transfer line reaction zone.

8. A process according to claim 7 wherein the temperature in said transfer line reaction zone is above about 1100° F. and the temperature in said dense turbulent fluidized bed is lower but has a definite relationship to that in said transfer line reaction zone.

9. A process according to claim 7 wherein the particulate solids comprise coke particles and the hydrocarbon oil feed is a residual hydrocarbon oil.

10. A process according to claim 9 wherein the velocity of the suspension passing through said transfer line reaction zone is above about 30 feet per second.

References Cited in the file of this patent

UNITED STATES PATENTS

| 2,438,728 | Tyson | Mar. 30, 1948 |
| 2,451,803 | Campbell et al. | Oct. 19, 1948 |
| 2,608,526 | Rex | Aug. 26, 1952 |
| 2,735,743 | Rex | Feb. 21, 1956 |
| 2,752,291 | Rex | June 26, 1956 |
| 2,813,916 | Boston | Nov. 19, 1957 |